Patented Nov. 5, 1940

2,220,765

UNITED STATES PATENT OFFICE 2,220,765

VITREOUS MATERIAL

Mitsuo Hirose and Hiroshi Kamogawa, Kawasaki, Japan, assignors to General Electric Company, a corporation of New York No Drawing. Application February 7, 1938, Serial No. 189,276. In Japan February 6, 1937

2 Claims. (Cl. 106—36.1)

(Granted under the provisions of sec. 14, act of March 2, 1927; 357 O. G. 5)

The present invention relates to the manufacture of new vitreous materials having high dielectric constant, and other desirable properties.

The object of the invention is to provide a product suitable for use as a dielectric element in capacitors because of its high dielectric constant and relatively low power factor, such product also being adapted for various other uses.

In accordance with this invention a vitreous composition is provided containing about 10 to 60 mol per cent of titanium oxide, about 20 to 80 mol per cent of either load oxide or barium oxide, or a mixture of both, and in addition a suitable content of silica or other ingredients commonly used in the manufacture of glass. Small amounts of modifying ingredients, such as the oxides of aluminum, magnesium, calcium, manganese (magnesium dioxide or manganous oxide), phosphorous, or boron, or mixtures of such products may be present. For example, typical mixtures may consist of the following:

Example A

| | Mol per cent |
|---|---|
| Titanium dioxide | 25.0 |
| Lead oxide | 41.7 |
| Silica | 33.3 |

Example B

| | Mol per cent |
|---|---|
| Titanium dioxide | 23.4 |
| Lead oxide | 36.5 |
| Silica | 37.7 |
| Aluminum oxide | 2.4 |

A mixture of the described ingredients is fused in the usual way in an oxygenous atmosphere. In some cases a portion of the lead oxide may be replaced by the oxides of the classes consisting of the oxides of antimony, aluminum, calcium, tin, zinc or bismuth.

Vitreous material containing the ingredients of Example A was found to have a dielectric constant of 24.5, power factor (tan δ) 0.25 per cent, and a refractive index 2.060. The composition made from the ingredients of Example B was found to have a dielectric constant of 20.0, power factor 0.20 per cent and refractive index 2.015. It will be observed that the dielectric constant is extremely high, the peak value heretofore obtainable for vitreous materials being 17.7. The refractive index also is unusually high, the peak value heretofore being about 1.9626. The refractory glass sold as Pyrex has a power factor of 0.60.

The glass made in accordance with the present invention may be used as a dielectric material for capacitors (condensers). Mica, which has been heretofore used as a mineral dielectric material, has a dielectric constant of about 6 to 7. As a result of the markedly higher dielectric constant of the vitreous material herein described, the volume of a capacitor of given capacity may be materially decreased, which is particularly to be desired in radio apparatus. Glasses made in accordance with this invention are readily formed in various shapes for use in electrical apparatus. Having a high refractive index these glasses advantageously may be used in the manufacture of various optical appliances. Glasses embodying this invention also may be used as bonding agent for cementing particles of mineral material, such for example, as titanium dioxide, as described in copending application of Louis Navias, Serial No. 182,564, filed December 30, 1937, which is assigned to the same assignee as the present application.

What we claim as new and desire to secure by Letters Patent of the United States is:

1. A capacitor dielectric element comprising a glass having a dielectric constant of about 20 and containing about 20 to 25 mol per cent titanium oxide, about 36 to 41 mol per cent lead oxide and about 33 to 38 mol per cent silica.

2. A capacitor dielectric element comprising a glass having a dielectric constant of about 20 and consisting of about 23.4 mol per cent of titanium dioxide, about 36.5 mol per cent lead oxide, about 37.7 mol per cent of silica, and about 2.4 mol per cent of aluminum oxide.

MITSUO HIROSE.
HIROSHI KAMOGAWA.